(12) United States Patent
Rathore

(10) Patent No.: US 9,453,109 B2
(45) Date of Patent: Sep. 27, 2016

(54) CURABLE SILSESQUIOXANE POLYMERS, COMPOSITIONS, ARTICLES, AND METHODS

(71) Applicant: 3M INNOVATIVE PROPERTIES COMPANY, St. Paul, MN (US)

(72) Inventor: Jitendra S. Rathore, Woodbury, MN (US)

(*) Notice: Subject to any disclaimer, the term of this patent is extended or adjusted under 35 U.S.C. 154(b) by 0 days.

(21) Appl. No.: 14/441,522

(22) PCT Filed: Dec. 16, 2013

(86) PCT No.: PCT/US2013/075237
§ 371 (c)(1),
(2) Date: May 8, 2015

(87) PCT Pub. No.: WO2014/099699
PCT Pub. Date: Jun. 26, 2014

(65) Prior Publication Data
US 2015/0299399 A1    Oct. 22, 2015

Related U.S. Application Data

(60) Provisional application No. 61/829,357, filed on May 31, 2013, provisional application No. 61/740,590, filed on Dec. 21, 2012.

(51) Int. Cl.
| C08G 77/20 | (2006.01) |
| C08G 77/16 | (2006.01) |
| C09D 183/04 | (2006.01) |
| B05D 3/06 | (2006.01) |
| C09D 183/06 | (2006.01) |

(52) U.S. Cl.
CPC ............ *C08G 77/20* (2013.01); *B05D 3/067* (2013.01); *C09D 183/04* (2013.01); *C09D 183/06* (2013.01); *C08G 77/16* (2013.01)

(58) Field of Classification Search
None
See application file for complete search history.

(56) References Cited

U.S. PATENT DOCUMENTS

| 4,761,393 | A | 8/1988 | Baleiko | |
| 4,822,828 | A | 4/1989 | Swofford | |
| 5,047,492 | A | 9/1991 | Weidner | |
| 5,484,867 | A | 1/1996 | Lichtenhan | |
| 5,609,925 | A | 3/1997 | Camilletti | |
| 5,755,867 | A * | 5/1998 | Chikuni | C08K 3/22 106/287.11 |
| 5,981,670 | A * | 11/1999 | Itoh | C08G 77/20 525/477 |
| 6,770,726 | B1 | 8/2004 | Arkles | |
| 7,241,437 | B2 | 7/2007 | Davidson | |
| 8,431,670 | B2 | 4/2013 | Allen | |
| 2003/0055193 | A1 | 3/2003 | Lichtenhan | |
| 2004/0047988 | A1 * | 3/2004 | Lee | C08G 77/06 427/240 |
| 2005/0215807 | A1 | 9/2005 | Morimoto | |
| 2008/0286467 | A1 | 11/2008 | Allen | |
| 2009/0005479 | A1 * | 1/2009 | Ou | C08L 83/04 524/264 |
| 2011/0045387 | A1 | 2/2011 | Allen | |
| 2011/0048787 | A1 | 3/2011 | Allen | |
| 2011/0083887 | A1 | 4/2011 | Brock | |
| 2011/0160330 | A1 | 6/2011 | Nagai | |
| 2012/0003437 | A1 * | 1/2012 | Wada | G03F 7/0757 428/195.1 |

FOREIGN PATENT DOCUMENTS

| WO | WO 2009/085926 | 7/2009 |
| WO | WO 2009/091440 | * 7/2009 |
| WO | WO 2014/099562 | 6/2014 |

OTHER PUBLICATIONS

Abe et al., "Preparation and Properties of Silicon-containing Hybrid Gels from Vinyltrimethoxysilane," *Journal of Non-Crystalline Solids*, 1992; 147 & 148:47-51.
Gelest "Reactive Siliones: Forging New Polymer Lines", Silsesquioxanes, pp. 45-49 [undated, believed to have been published more than 1 year prior to the filing of this application].
(Continued)

*Primary Examiner* — Marc Zimmer

(57) ABSTRACT

A curable silsesquioxane polymer, a composition including such polymer, an article having a layer disposed thereon that includes the curable polymer and/or the cured polymer, and a method of forming a cured coating, wherein the curable silsesquioxane polymer includes a three-dimensional branched network having the formula: (I), or (II) wherein: the oxygen atom at the * is bonded to another Si atom within the three-dimensional branched network; R is an organic group comprising an ethylenically unsaturated group; R2 is an organic group that is not an ethylenically unsaturated group, and n or n+m is an integer of greater than 3; and the —OH groups are present in an amount of at least 15 wt-% of the polymer.

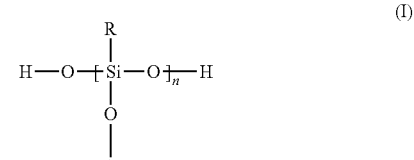

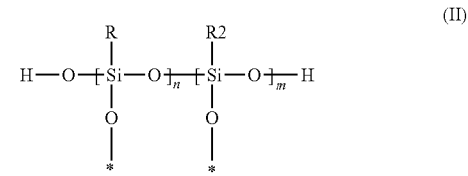

12 Claims, No Drawings

(56) References Cited

OTHER PUBLICATIONS

International Search Report PCT/US2013/075237; Jan. 30, 2014, 4 pgs.

Shin et al., "Surface Properties of Silica Nanoparticles Modified with Polymers for Polymer Nanocomposite Applications" Journal of Industrial and Engineering Chemistry 14 (2008) 515-519.

Baney et al., "Silesquioxanes", Chem. Rev. 1995, 95, 1409-1430.

* cited by examiner

CURABLE SILSESQUIOXANE POLYMERS, COMPOSITIONS, ARTICLES, AND METHODS

CROSS REFERENCE TO RELATED APPLICATIONS

This is a national stage filing under 35 U.S.C. 371 of PCT/US2013/075237, filed Dec. 16, 2013, which claims priority to U.S. Provisional Application No. 61/829,357, filed May 31, 2013 and U.S. Provisional Application No. 61/740,590, filed Dec. 21, 2012, the disclosure of which is incorporated by reference in their entirety herein.

BACKGROUND

Hard coatings can generally be defined as clear coatings that provide protection against abrasion and scratch when applied to relatively softer substrates. In addition to the abrasion and scratch-resistance, excellent durability is also desired. In general, hard-coats can be prepared by mixing silica nanoparticles with a base polymer, for example, an epoxy- or acrylate-based polymer. The major drawback for some epoxy- or acrylate-based coatings is poor outdoor weatherability. Thus, new polymers are needed that have better outdoor weatherability and that can be used to prepare hard coats.

SUMMARY

The present disclosure provides a curable silsesquioxane polymer, a composition including such polymer, an article having a layer disposed thereon that includes the curable polymer and/or the cured polymer, and a method of forming a cured coating. Such silsesquioxane (SSQ) polymers can have excellent outdoor weatherability, as well as desirable UV and moisture resistance properties.

In one embodiment, the present disclosure provides a curable silsesquioxane polymer that includes a three-dimensional branched network having the formula:

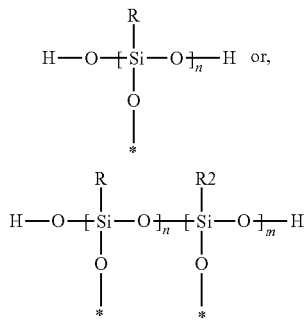

wherein: the oxygen atom at the * is bonded to another Si atom within the three-dimensional branched network; R is an organic group comprising an ethylenically unsaturated group; R2 is an organic group that is not an ethylenically unsaturated group; n or n+m is an integer of greater than 3; and the —OH groups are present in an amount of at least 15 wt-% of the polymer.

In one embodiment, the present disclosure provides a curable silsesquioxane polymer that includes a three-dimensional branched network which is a condensation reaction product of a compound having the formula Z—Y—Si(R$^1$)$_3$, wherein: Y is a bond, an alkylene group, an arylene group, or a combination thereof; Z is an ethylenically unsaturated group selected from a vinyl group, a vinylether group, a (meth)acryloyloxy group, and a (meth)acryloylamino group; and each R$^1$ group is independently a hydrolyzable group; wherein the polymer includes —OH groups in an amount of at least 15 wt-% of the polymer.

In another embodiment, a curable silsesquioxane polymer is provided that includes a three-dimensional branched network which is a condensation reaction product of a compound having the formula Z—Y—Si(R')$_3$ and a compound having the formula X—Y—Si(R$^1$)$_3$, wherein X is hydrogen, alkyl, aryl, aralkyl, alkyaryl, a reactive group that is not an ethylenically unsaturated group, or a combination thereof. The alky group can optionally comprise halogen substituents such as in the case of fluoroalkyl.

In one embodiment, the present disclosure provides a curable composition that includes a photoinitiator (e.g., a free-radical initiator) and a curable silsesquioxane polymer of the present disclosure. In certain embodiments, the curable composition can optionally include nanoparticles. In certain embodiments, the curable composition can optionally include an organic solvent.

In one embodiment, the present disclosure provides an article that includes a substrate and a curable composition of the present disclosure in a layer disposed on at least a portion of at least one surface of the substrate.

In one embodiment, the present disclosure provides an article that includes a substrate and a cured coating layer prepared by UV curing a curable composition of the present disclosure disposed on at least a portion of at least one surface of the substrate.

In one embodiment, the present disclosure provides a method of making a cured coating on a substrate surface. The method includes: coating a curable composition of the present disclosure on at least a portion of at least one substrate surface; optionally exposing the coated curable composition to conditions that allow an organic solvent, if present, to evaporate from the curable composition; and UV curing the curable composition.

As used herein, the term "organic group" means a hydrocarbon group (with optional elements other than carbon and hydrogen, such as oxygen, nitrogen, sulfur, silicon, and halogens) that is classified as an aliphatic group, cyclic group, or combination of aliphatic and cyclic groups (e.g., alkaryl and aralkyl groups). In the context of the present invention, the organic groups are those that do not interfere with the formation of curable silsesquioxane polymer. The term "aliphatic group" means a saturated or unsaturated linear or branched hydrocarbon group. This term is used to encompass alkyl, alkenyl, and alkynyl groups, for example. The term "alkyl group" is defined herein below. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" are defined herein below. The term "heterocyclic group" means a closed ring hydrocarbon in which one or more of the atoms in the ring is an element other than carbon (e.g., nitrogen, oxygen, sulfur, etc.). The organic group can have any suitable valency but is often monovalent or divalent.

The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, or 1 to 4 carbon atoms. Examples of alkylene groups include, but are not limited to, methylene, ethylene, 1,3-propylene, 1,2-propylene, 1,4-butylene, 1,4-cyclohexylene, and 1,4-cyclohexyldimethylene.

The term "alkoxy" refers to a monovalent group having an oxy group bonded directly to an alkyl group.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms. In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, and anthracyl.

The term "arylene" refers to a divalent group that is aromatic and, optionally, carbocyclic. The arylene has at least one aromatic ring. Any additional rings can be unsaturated, partially saturated, or saturated. Optionally, an aromatic ring can have one or more additional carbocyclic rings that are fused to the aromatic ring. Unless otherwise indicated, arylene groups often have 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms and an aryl portion often has 6 to 20 carbon atoms, 6 to 18 carbon atoms, 6 to 16 carbon atoms, 6 to 12 carbon atoms, or 6 to 10 carbon atoms.

The term "aralkylene" refers to a divalent group that is an alkylene group substituted with an aryl group or an alkylene group attached to an arylene group. The term "alkarylene" refers to a divalent group that is an arylene group substituted with an alkyl group or an arylene group attached to an alkylene group. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms. The term "hydrolyzable group" refers to a group that can react with water having a pH of 1 to 10 under conditions of atmospheric pressure. The hydrolyzable group is often converted to a hydroxyl group when it reacts. The hydroxyl group often undergoes further reactions. Typical hydrolyzable groups include, but are not limited to, alkoxy, aryloxy, aralkyloxy, alkaryloxy, acyloxy, or halo. As used herein, the term is often used in reference to one of more groups bonded to a silicon atom in a silyl group.

The term "alkoxy" refers to a monovalent group having an oxy group bonded directly to an alkyl group.

The term "aryloxy" refers to a monovalent group having an oxy group bonded directly to an aryl group.

The terms "aralkyloxy" and "alkaryloxy" refer to a monovalent group having an oxy group bonded directly to an aralkyl group or an alkaryl group, respectively.

The term "acyloxy" refers to a monovalent group of the formula —O(CO)$R^b$ where $R^b$ is alkyl, aryl, aralkyl, or alkaryl. Suitable alkyl $R^b$ groups often have 1 to 10 carbon atoms, 1 to 6 carbon atoms, or 1 to 4 carbon atoms. Suitable aryl $R^b$ groups often have 6 to 12 carbon atoms such as, for example, phenyl. Suitable aralkyl and alkaryl $R^b$ groups often have an alkyl group with 1 to 10 carbon atoms, 1 to 6 carbon atoms, or 1 to 4 carbon atoms and an aryl having 6 to 12 carbon atoms.

The term "halo" refers to a halogen atom such as fluoro, bromo, iodo, or chloro. When part of a reactive silyl, the halo group is often chloro.

The term "(meth)acryloyloxy group" includes an acryloyloxy group (—O—(CO)—CH=CH$_2$) and a methacryloyloxy group (—O—(CO)—C(CH$_3$)=CH$_2$).

The term "(meth)acryloylamino group" includes an acryloylamino group (—NR—(CO)—CH=CH$_2$) and a methacryloylamino group (—NR—(CO)—C(CH$_3$)=CH$_2$) including embodiments wherein the amide nitrogen is bonded to a hydrogen, methyl group, or ethyl group (R is H, methyl, or ethyl).

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein, in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

When a group is present more than once in a formula described herein, each group is "independently" selected, whether specifically stated or not. For example, when more than one R group is present in a formula, each R group is independently selected. Furthermore, subgroups contained within these groups are also independently selected. For example, when each R group contains a Y group, each Y is also independently selected.

As used herein, the term "room temperature" refers to a temperature of 20° C. to 25° C. or 22° C. to 25° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF EXEMPLARY EMBODIMENTS

The present disclosure provides curable silsesquioxane (SSQ) polymers that have excellent outdoor weatherability, as well as desirable UV and moisture resistance properties that make them good for preparing protective coatings.

In one embodiment, the present disclosure provides a curable composition that includes a photoinitiator (e.g., a free-radical initiator) and a curable silsesquioxane polymer of the present disclosure. In certain embodiments, the curable composition can optionally include nanoparticles (e.g., silica, titania, or zirconia) that can impart hardness to the coating. In certain embodiments, the curable composition can optionally include an organic solvent.

This technology can provide a weatherable silsesquioxane glass coating or hard coating that has multiple applications. For example, such coatings can be used as anti-scratch and anti-abrasion coatings for various polycarbonate lens and polyesters films, which require additional properties such as optical clarity, durability, hydrophobicity, etc., or any other application where use of temperature, radiation, or moisture may cause degradation of films.

The curable silsesquioxane polymer can be a homopolymer or copolymer. As used herein, polymer refers to the homopolymer and copolymer unless indicated otherwise.

In one embodiment, the present disclosure provides a curable silsesquioxane polymer that includes a three-dimensional branched network having the formula:

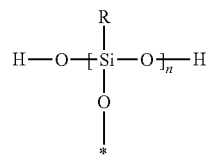

wherein the oxygen atom at the * is bonded to another Si atom within the three-dimensional branched network.

In another embodiment, the present disclosure provides a curable silsesquioxane polymer that includes a three-dimensional branched network having the formula:

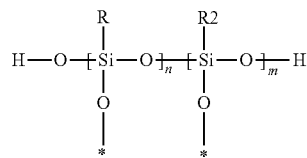

wherein the oxygen atom at the * is bonded to another Si atom within the three-dimensional branched network.

In certain embodiments of the curable silsesquioxane polymer, R is an organic group that includes an ethylenically unsaturated group. In certain embodiments of the curable silsesquioxane polymer, R has the formula —Y—Z.

In certain embodiments of the curable silsesquioxane polymer, R2 is an organic group that lacks an ethylenically unsaturated group. In certain embodiments of the curable silsesquioxane polymer, R2 has the formula —Y—X.

In certain embodiments of the curable silsesquioxane polymer, n is an integer of greater than 3. In certain embodiments, n is an integer of at least 10. In certain embodiments, n is an integer of no greater than 100. In certain embodiments, n is an integer of no greater than 25.

For embodiments wherein the curable silsesquioxane polymer is a copolymer comprising both n and m units, the sum of n+m is an integer of greater than 3. In certain embodiments, n+m is an integer of at least 10. In certain embodiments, n+m is an integer of no greater than 100. In certain embodiments, n+m is an integer of no greater than 25. In some embodiment, n and m are selected such the copolymer comprises at least 25, 26, 27, 28, 29, or 30 mol % of repeat units comprising ethylenically unsaturated group(s) R. In some embodiment, n and m are selected such the copolymer comprises no greater than 85, 80, 75, 70, 65, or 60 mol % of repeat units comprising ethylenically unsaturated group(s) R.

In certain embodiments of the curable silsesquioxane polymer, the —OH groups are present in an amount of at least 15 wt-% of the polymer. As the hydroxyl content increases the peel adhesion can increase. In certain embodiments, the —OH groups are present in an amount of at least 16, 17, 18, 19, or 20 wt-% of the polymer. In some embodiments, the —OH groups are present in an amount of at least 21, 22, 23, 24, or 25 wt-% of the polymer. In some embodiments, the —OH groups are present in an amount of at least 26, 27, 28, 29, or 30 wt-% of the polymer. The peel adhesion generally reaches a peak value at an optimum —OH concentration. The peel adhesion can decrease when the —OH content exceeds the optimum concentration. Further, the optimum concentration can vary depending on the monomer of the homopolymer or monomers of the copolymer. In certain embodiments, the —OH groups are present in an amount of no greater than 60 wt-% of the polymer. In certain embodiments, the —OH groups are present in an amount of no greater than 55 wt-%, or 50 wt-%, or 45 wt-%, or 40 wt-% or 35 wt-% of the polymer. In certain embodiments, the —OH groups are present in an amount of no greater than 30 wt-% of the polymer.

In one embodiment, the present disclosure provides a curable silsesquioxane polymer that includes a three-dimensional branched network which is a condensation reaction product of a compound having the formula Z—Y—Si(R$^1$)$_3$.

In another embodiment, the present disclosure provides a curable silsesquioxane copolymer that includes a three-dimensional branched network which is a condensation reaction product of a compound having the formula Z—Y—Si(R¹)₃ and a compound having the formula X—Y—Si(R¹)₃.

In certain embodiments of the R group of the curable silsesquioxane polymer and/or the reactant Z—Y—Si(R¹)₃, Y is a bond, an alkylene group, an arylene group, or a combination thereof. In certain embodiments, Y is a bond, a (C1-C20)alkylene group, a (C6-C12)arylene group, a (C6-C12)alk(C1-C20)arylene group, a (C6-C12)ar(C1-C20)alkylene group, or a combination thereof.

In certain embodiments of the R group of the curable silsesquioxane polymer and/or the reactant Z—Y—Si(R¹)₃, Z is an ethylenically unsaturated group selected from a vinyl group, a vinylether group, a (meth)acryloyloxy group, and a (meth)acryloylamino group (including embodiments wherein the nitrogen is optionally substituted with an alkyl such as methyl or ethyl). In certain embodiments, Z is a vinyl group.

In certain embodiments of the R2 group of the curable silsesquioxane polymer and/or the reactant X—Y—Si(R¹)₃, X is hydrogen, an optionally halogenated (C1-C20)alkyl group such as (C4-C6) fluoroalkyl, a (C6-C12)aryl group, a (C6-C12)alk(C1-C20)aryl group, a (C6-C12)ar(C1-C20)alkyl group, a reactive group that is not an ethylenically unsaturated group, or a combination thereof.

In some embodiments, X comprises an epoxide ring.

In certain embodiments of the R group of the curable silsesquioxane polymer and/or the reactant Z—Y—Si(R¹)₃ and/or the reactant X—Y—Si(R¹)₃, each R¹ group is independently a hydrolyzable group. In certain embodiments of R¹, the hydrolyzable group is selected from an alkoxy, aryloxy, aralkyloxy, alkaryloxy, acyloxy, and halo. In certain embodiments of R¹, the hydrolyzable group is an alkoxy group.

Curable silsesquioxane polymers can be made by the condensation of reactants of the formula Z—Y—Si(R¹)₃. Examples of such reactants include vinyltriethoxysilane, allyltriethoxysilane, allylphenylpropyltriethoxysilane, 3-butenyltriethoxysilane, docosenyltriethoxysilane, and hexenyltriethoxysilane. Condensation of such reactants can be carried out using conventional techniques, as exemplified in the Examples Section.

Exemplary silsesquioxane polymers of the present disclosure can be made by the condensation of exemplary reactants of the formula Z—Y—Si(R¹)₃ as follows:

A
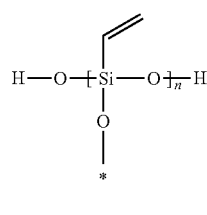

B
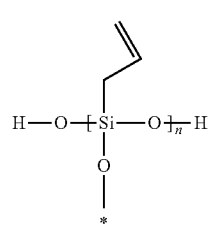

C
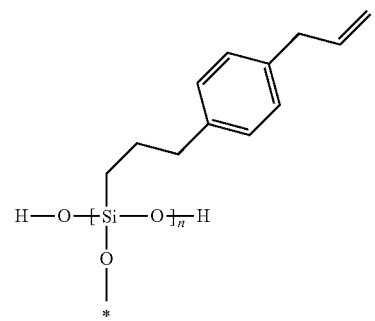

D
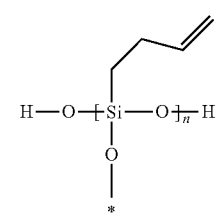

E
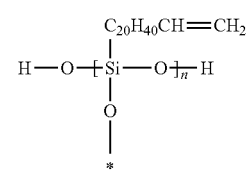

F
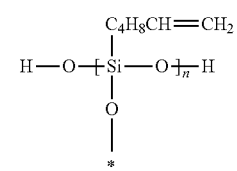

These polymers are poly(vinylsilsesquioxane) (A), poly(allylsilsesquioxane) (B), poly(allylphenylpropylsilsesquioxane) (C), poly(3-butenylsilsesquioxane) (D), poly(docosenyl silsesquioxane) (E), and poly(hexenylsilsesquioxane) (F).

An exemplary curable silsesquioxane polymer of the present disclosure that has the general formula:

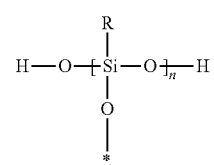

has the following more specific three-dimensional branched network structure (wherein the oxygen atom in the formula above at the * above is bonded to another Si atom within the three-dimensional branched network; R is a vinyl group; n is an integer of greater than 3; and the —OH groups are present in an amount of at least 15 wt-% of the polymer):

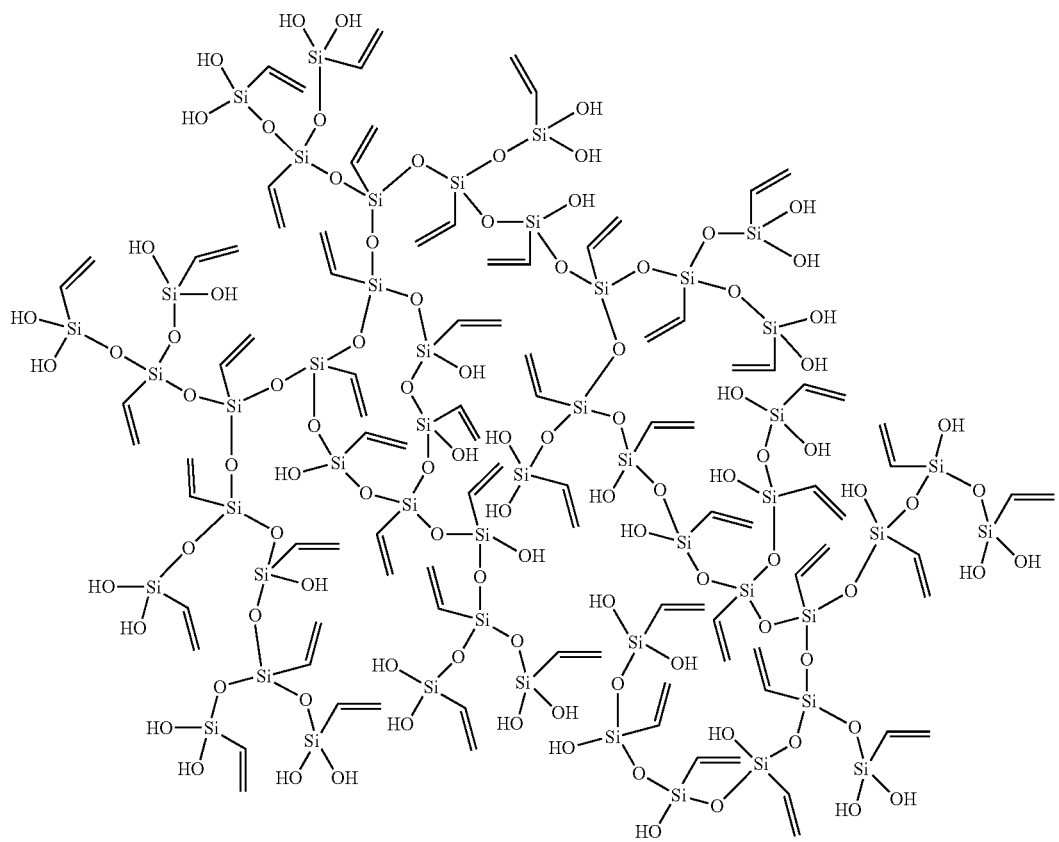

In other embodiments, curable silsesquioxane copolymers can be made by the condensation of two or more reactants of the formula Z—Y—Si(R$^1$)$_3$. For example, vinyltriethoxylsilane or allytriethoxysilane can be coreacted with an alkenylalkoxylsilane such as 3-butenyltriethoxysilane and hexenyltriethoxysilane. In this embodiment, the silsesquioxane polymers may comprise at least two different Z groups (e.g. Z' and Z"), yet the same Y groups. Alternatively, the silsesquioxane polymers may comprise at least two different Y groups (e.g. Y' and Y"), yet the same Z group (e.g. vinyl). Further, the silsesquioxane polymers may comprise at least two reactants wherein both Y and Z are different than each other. In such embodiment, R of the curable silsesquioxane polymer formulas is independently an organic group comprising an ethylenically unsaturated group (e.g. such as a vinyl group).

In yet other embodiments, curable silsesquioxane copolymers can be made by the condensation of at least one reactant of the formula Z—Y—Si(R$^1$)$_3$ and at least one reactant of the formula X—Y—Si(R$^1$)$_3$. Examples of reactants include for example aromatic trialkoxysilanes such as phenyltrimethoxylsilane, C1-C12 alkyl trialkoxysilanes such as methyltrimethoxylsilane, fluoroalkyl trialkoxysilanes such as nonafluorohexyltriethoxysilane, and trialkoxysilanes comprising a reactive group that is not an ethylenically unsaturated group such as glycidoxypropyltriethoxysilane.

The inclusion of the co-reactant of the formula Z—Y—Si(R$^1$)$_3$ can be used to enhance certain properties depending on the selection of the R2 group. For example, when R2 comprises an aromatic group such as phenyl, the thermal stability can be improved (relative to a homopolymer of vinyltrimethoxysilane). For example the weight loss of vinyl-co-phenyl silsequioxane, according to thermogravimetric analysis, is 17% as compared to 27% for poly(vinyl silsequioxane). In another example, when R2 is methyl the glass transition temperature (Tg) can be increased (relative to a homopolymer of vinyltrimethoxysilane). When R2 comprises a reactive group, such as an epoxy, improved hardness can be obtained (relative to a homopolymer of vinyltrimethoxysilane). Further, when R2 comprises a fluoroalkyl group, the hydrophobicity can be improved.

The amount of reactant(s) of the formula Z—Y—Si(R$^1$)$_3$ can range up to 100 mol % in the case of homopolymers. The copolymers typically comprise no greater than 99, 98, 97, 96, 95, 94, 93, 92, 91, or 90 mol % of reactant(s) of the formula Z—Y—Si(R$^1$)$_3$. In some embodiments, the amount of reactant(s) of the formula Z—Y—Si(R$^1$)$_3$ is no greater than 85, 80, 75, 70, or 60 mol %. In some embodiments, the amount of reactant(s) of the formula Z—Y—Si(R$^1$)$_3$ is at least 15, 20, 25, or 30 mol %.

The amount of reactant(s) of the formula X—Y—Si(R$^1$)$_3$ can be as little as 1, 2, 3, 4, 5, 6, 7, 8, 9, or 10 mol % of the copolymer. In some embodiments, the amount of reactant(s)

of the formula X—Y—Si(R$^1$)$_3$ is at least 15, 20, 25, or 30 mol %. The amount of reactant(s) of the formula X—Y—Si(R$^1$)$_3$ is typically no greater than 75 mol % or 70 mol %. In some embodiments, the amount of reactant(s) of the formula X—Y—Si(R$^1$)$_3$ is at least 15, 20, 25, or 30 mol %. In some embodiments, the amount of reactant(s) of the formula X—Y—Si(R$^1$)$_3$ is no greater than 65 or 60 mol %. It is appreciated that the amount of reactants of the formula Z—Y—Si(R$^1$)$_3$ or X—Y—Si(R$^1$)$_3$ is equivalent to the amount of repeat units derived from Z—Y—Si(R$^1$)$_3$ or X—Y—Si(R$^1$)$_3$. In some embodiments the molar ratio of reactant(s) of the formula Z—Y—Si(R$^1$)$_3$ to molar ratio to reactant(s) of the formula X—Y—Si(R$^1$)$_3$ ranges from about 10:1; 15:1, or 10:1 to 1:4; or 1:3, or 1:2. Exemplary curable silsesquioxane copolymers of the present disclosure that has the general formula:

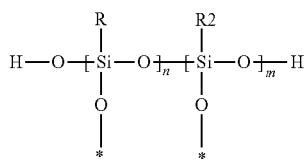

has the following more specific three-dimensional branched network structure (wherein the oxygen atom in the formula above at the * above is bonded to another Si atom within the three-dimensional branched network; R is a vinyl group; n is an integer of greater than 3; R2 is phenyl, methyl, nonafluorohexyl, or glycidoxypropyl; and the —OH groups are present in an amount of at least 15 wt-% of the polymer):

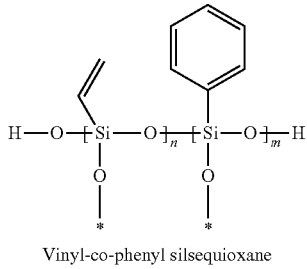
Vinyl-co-phenyl silsequioxane

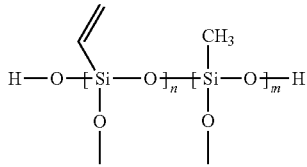
Vinyl-co-methyl silsesquioxane

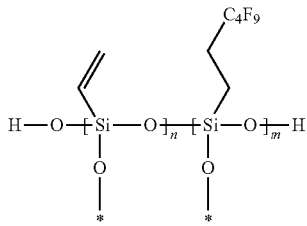
Vinyl-co-nonafluorohexyl silsesquioxane

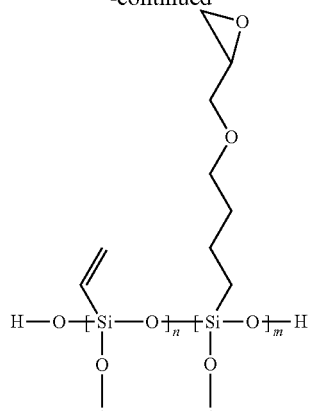
Vinyl-co-glycidoxypropyl silsesquioxane

The curable silsesquioxane polymers are generally tacky (due to the —OH content), soluble in organic solvents (particularly polar organic solvents), and coatable. Thus, such curable silsesquioxane polymers can be easily processed. They can be easily applied to a substrate. They also adhere well to a variety of substrates. For example, in certain embodiments, a curable silsesquioxane polymer of the present disclosure has peel force from glass of at least 1 Newtons per decimeter (N/dm), or at least 2 N/dm, per the Method for Peel Adhesion Measurement detailed in the Examples Section. In certain embodiments, a curable silsesquioxane polymer of the present disclosure has peel force from glass of no greater than 6 N/dm, per the Method for Peel Adhesion Measurement detailed in the Examples Section.

Such curable silsesquioxane polymers can be combined with a photoinitiator and UV cured. Suitable photoinitiators include a variety of free-radical photoinitiators. Exemplary free-radical photoinitiators can be selected from benzophenone, 4-methylbenzophenone, benzoyl benzoate, phenylacetophenones, 2,2-dimethoxy-2-phenylacetophenone, alpha, alpha-diethoxyacetophenone, 1-hydroxy-cyclohexyl-phenyl-ketone (available under the trade designation IRGACURE 184 from BASF Corp., Florham Park, N.J.), 2-hydroxy-2-methyl-1-phenylpropan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one (available under the trade designation DAROCURE 1173 from BASF Corp.), 2,4,6-trimethylbenzoyl-diphenylphosphine oxide, and combinations thereof (e.g., a 50:50 by wt. mixture of 2,4,6-trimethylbenzoyl-diphenylphosphine oxide and 2-hydroxy-2-methyl-1-phenylpropan-1-one, available under the trade designation DAROCURE 4265 from BASF Corp.).

A photoinitiator is typically present in a coating composition in an amount of at least 0.01 percent by weight (wt-%), based on the total weight of curable material in the coating composition. A photoinitiator is typically present in a coating composition in an amount of no greater than 5 wt-%, based on the total weight of curable material in the coating composition.

Such curable silsesquioxane polymers can be combined with nanoparticles that can impart hardness to a coating. Suitable nanoparticles of the present disclosure include an inorganic oxide. Exemplary nanoparticle can include an oxide of a non-metal, an oxide of a metal, or combinations thereof. An oxide of a non-metal includes an oxide of, for example, silicon or germanium. An oxide of a metal includes an oxide of, for example, iron, titanium, cerium, aluminum, zirconium, vanadium, zinc, antimony, and tin. A combination of a metal and non-metal oxide includes an oxide of aluminum and silicon.

The nanoparticle can have an average particle size of no greater than 100 nanometers (nm), no greater than 75 nanometers, no greater than 50 nanometers, no greater than 25 nanometers, no greater than 20 nanometers, no greater than 15 nanometers, or no greater than 10 nanometers. The nanoparticle can have an average particle size of at least 1 nanometer, at least 5 nanometers, at least 15 nanometers, at least 20 nanometers, at least 25 nanometers, at least 50 nanometers, or at least 75 nanometers.

Various nanoparticles are commercially available. Commercial sources of nanoparticles are available from Nyacol Co., Ashland, Mass., Solvay-Rhodia (Lyon, France), and Nalco Co., Naperville, Ill. Nanoparticles can also be made using techniques known in the art. For example, zirconia nanoparticles can be prepared using hydrothermal technology, as described for example in PCT Publication No. WO2009/085926 (Kolb et al.). Suitable zirconia nanoparticles are also those described in, for example, U.S. Pat. No. 7,241,437 (Davidson, et al.).

In some embodiments, the nanoparticles may be in the form of a colloidal dispersion. Colloidal silica nanoparticles in a polar solvent are particularly desirable. Silica sols in a polar solvent such as isopropanol are available commercially under the trade names ORGANOSILICASOL IPA-ST-ZL, ORGANOSILICASOL IPA-ST-L, and ORGANOSILICASOL IPA-ST from Nissan Chemical Industries, Ltd., Chiyoda-Ku Tokyo, Japan.

Preferably, the nanoparticles are dispersed in a curable coating composition of the present disclosure. If used, nanoparticles are typically present in a curable coating composition in an amount of at least 5 wt-%, based on the total weight of the composition. If used, nanoparticles are typically present in a curable coating composition in an amount of no greater than 80 wt-%, or no greater than 50 wt-%, based on the total weight of the composition. Depending on the particle size of the nanoparticles and the amount of nanoparticles added, certain compositions may be hazy. For example, a composition that includes over 50 wt-% of 10 nanometer nanoparticles may be hazy, but such composition can be useful for certain applications.

A coating composition that includes a curable silsesquioxane polymer, a photoinitiator, and optional nanoparticles, can also include an optional organic solvent, if desired. Useful solvents for the coating compositions include those in which the compound is soluble at the level desired. Typically, such organic solvent is a polar organic solvent. Exemplary useful polar solvents include, but are not limited to, ethanol, isopropanol, methyl ethyl ketone, methyl isobutyl ketone, dimethylformamide, and tetrahydrofuran. These solvents can be used alone or as mixtures thereof.

Any amount of the optional organic solvent can be used. For example, the curable coating compositions can include up to 50 wt-% or even more of organic solvent. The solvent can be added to provide the desired viscosity to the coating composition. In some embodiments, no solvent or only low levels (e.g., up to 10 wt-%) of organic solvent is used in the curable coating composition.

The coating composition is typically a homogeneous mixture (e.g., of just the curable silsesquioxane polymer and photoinitiator) that has a viscosity appropriate to the application conditions and method. For example, a material to be brush or roller coated would likely be preferred to have a higher viscosity than a dip coating composition. Typically, a coating composition includes at least 5 wt-%, of the polymer, based on the total weight of the coating composition. A coating composition often includes no greater than 80 wt-%, of the polymer, based on the total weight of the coating composition.

A wide variety of coating methods can be used to apply a composition of the present disclosure, such as brushing, spraying, dipping, rolling, spreading, and the like. Other coating methods can also be used, particularly if no solvent is included in the coating composition. Such methods include knife coating, gravure coating, die coating, and extrusion coating, for example.

A curable coating composition of the present disclosure can be applied in a continuous or patterned layer. Such layer can be disposed on at least a portion of at least one surface of the substrate. If the curable composition includes an organic solvent, the coated curable composition can be exposed to conditions that allow the organic solvent to evaporate from the curable composition before UV curing the curable composition. Such conditions include, for example, exposing the composition to room temperature, or an elevated temperature (e.g., 60° C. to 70° C.).

Curing of a curable composition of the present disclosure occurs using UV radiation. Typically, the curing occurs for a time effective to render the coating sufficiently non-tacky to the touch.

In some embodiments, the pencil hardness after curing is at least H, 2H, or 3H. In some embodiments, the pencil hardness is no greater than 5H or 4H.

An exemplary UV-cured silsesquioxane polymer of the present disclosure has the following three-dimensional branched network structure (with residual R (e.g., vinyl) groups):

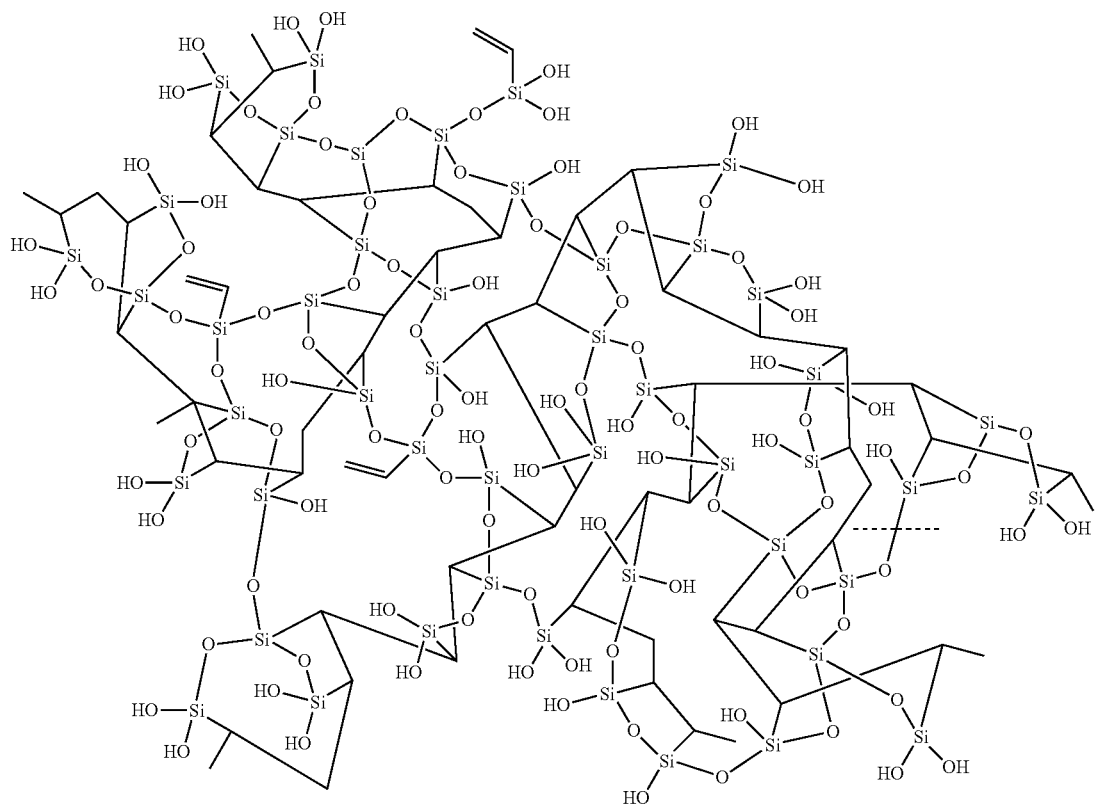

The substrate on which the coating can be disposed can be any of a wide variety of hard or flexible materials. Useful substrates include ceramics, siliceous substrates including glass, metal, natural and man-made stone, and polymeric materials, including thermoplastics and thermosets. Suitable materials include, for example, poly(meth)acrylates, polycarbonates, polystyrenes, styrene copolymers such as styrene acrylonitrile copolymers, polyesters, polyethylene terephthalate.

The following is a list of illustrative embodiments of the present disclosure.

Illustrative Embodiments

1. A curable silsesquioxane polymer comprising a three-dimensional branched network having the formula:

$$\text{H—O} \mathord{-\!\!\!} \left[ \begin{array}{c} R \\ | \\ Si \\ | \\ O \\ | \\ * \end{array} \mathord{-\!} O \right]_n \mathord{-\!\!\!} \text{H, or}$$

$$\text{H—O} \mathord{-\!\!\!} \left[ \begin{array}{c} R \\ | \\ Si \\ | \\ O \\ | \\ * \end{array} \mathord{-\!} O \right]_n \mathord{-\!\!\!} \left[ \begin{array}{c} R2 \\ | \\ Si \\ | \\ O \\ | \\ * \end{array} \mathord{-\!} O \right]_m \mathord{-\!\!\!} \text{H}$$

wherein:
the oxygen atom at the * is bonded to another Si atom within the three-dimensional branched network;
R is an organic group comprising an ethylenically unsaturated group;
R2 is an organic group that is not an ethylenically unsaturated group
n or n+m is an integer of greater than 3; and
the —OH groups are present in an amount of at least 15 wt-% of the polymer.

2. The curable silsesquioxane polymer of embodiment 1 wherein the —OH groups are present in an amount of at least 20 wt-% of the polymer.

3. The curable silsesquioxane polymer of embodiment 1 or 2 wherein the —OH groups are present in an amount of no greater than 60 wt-% of the polymer.

4. The curable silsesquioxane polymer of embodiment 3 wherein the —OH groups are present in an amount of no greater than 50 wt-% of the polymer.

5. The curable silsesquioxane polymer of embodiment 4 wherein the —OH groups are present in an amount of no greater than 30 wt-% of the polymer.

6. The curable silsesquioxane polymer of any one of embodiments 1 through 5 wherein n is an integer of at least 10.

7. The curable silsesquioxane polymer of any one of embodiments 1 through 6 wherein n is an integer of no greater than 100.

8. The curable silsesquioxane polymer of embodiment 7 wherein n is an integer of no greater than 25.

9. The curable silsesquioxane polymer of any one of embodiments 1 through 8 wherein R has the formula —Y—Z, wherein Y is a bond, an alkylene group, an arylene group, or a combination thereof, and Z is an ethylenically unsaturated group selected from a vinyl group, a vinylether group, a (meth)acryloyloxy group, and a (meth)acryloylamino group (including embodiments wherein the nitrogen is optionally substituted with methyl or ethyl).

10. The curable silsesquioxane polymer of any one of embodiments 1 through 9 wherein R2 has the formula —Y—X, wherein Y is a bond, an alkylene group, an arylene group, said groups further comprising O, N, or S, or a combination thereof; and X is hydrogen, alkyl that optionally comprises halogen substitutents, aryl, alkaryl, or a reactive group that is not an ethylenically unsaturated group, or a combination thereof.

11. The curable silsesquioxane polymer of embodiment 9 or 10 wherein Y is a bond, a (C1-C20)alkylene group, a (C6-C12)arylene group, a (C6-C12)alk(C1-C20)arylene group, a (C6-C12)ar(C1-C20)alkylene group, or a combination thereof.

12. The curable silsesquioxane polymer of embodiment 9 or 10 wherein Z is a vinyl group.

13. The curable silsesquioxane polymer of any one of embodiments 1 through 12 which has peel force from glass of at least 1 N/dm.

14. The curable silsesquioxane polymer of embodiment 13 which has peel force from glass of at least 2 N/dm.

15. The curable silsesquioxane polymer of any one of embodiments 1 through 14 which has peel force from glass of no greater than 6 N/dm.

16. A curable silsesquioxane polymer comprising a three-dimensional branched network which is a condensation reaction product of a compound having the formula Z—Y—Si(R$^1$)$_3$,
wherein:
Y is a bond, an alkylene group, an arylene group, or a combination thereof;
Z is an ethylenically unsaturated group selected from a vinyl group, a vinylether group, a (meth)acryloyloxy group, and a (meth)acryloylamino group (including embodiments wherein the nitrogen is optionally substituted with methyl or ethyl); and
each R$^1$ group is independently a hydrolysable group;
wherein the polymer includes —OH groups in an amount of at least 15 wt-% of the polymer.

17. A curable silsesquioxane polymer comprising a three-dimensional branched network which is a condensation reaction product of a compound having the formula Z—Y—Si(R$^1$)$_3$ and a compound having the formula X—Y—Si(R$^1$)$_3$
wherein:
Y is a bond, an alkylene group, an arylene group, or a combination thereof;
Z is an ethylenically unsaturated group selected from a vinyl group, a vinylether group, a (meth)acryloyloxy group, and a (meth)acryloylamino group (including embodiments wherein the nitrogen is optionally substituted with methyl or ethyl);
X is alkyl, fluoroalkyl, aryl, alkaryl, or a reactive group that is not an ethylenically unsaturated group, or a combination thereof; and
each R$^1$ group is independently a hydrolysable group;
wherein the polymer includes —OH groups in an amount of at least 15 wt-% of the polymer.

18. The curable silsesquioxane polymer of embodiment 16 or 17 wherein Y is a bond, a (C1-C20)alkylene group, a (C6-C12)arylene group, a (C6-C12)alk(C1-C20)arylene group, a (C6-C12)ar(C1-C20)alkylene group, or a combination thereof.

19. The curable silsesquioxane polymer of any one of embodiments 16 through 19 wherein Z is a vinyl group.

20. The curable silsesquioxane polymer of any one of embodiments 16 through 19 wherein the hydrolysable group is selected from an alkoxy, aryloxy, aralkyloxy, alkaryloxy, acyloxy, and halo.

21. The curable silsesquioxane polymer of embodiment 20 wherein the hydrolysable group is an alkoxy group.

22. The curable silsesquioxane polymer of any one of embodiments 16 through 21 wherein the —OH groups are present in an amount of at least 20 wt-% of the polymer.

23. The curable silsesquioxane polymer of any one of embodiments 16 through 21 wherein the —OH groups are present in an amount of no greater than 60 wt-% of the polymer.

24. The curable silsesquioxane polymer of any one of embodiments 16 through 23 which has peel force from glass of at least 1 N/dm.

25. The curable silsesquioxane polymer of embodiment 24 which has peel force from glass of at least 2 N/dm.

26. The curable silsesquioxane polymer of any one of embodiments 15 through 25 which has peel force from glass of no greater than 6 N/dm.

27. A curable composition comprising a photoinitiator and the curable silsesquioxane polymer of any one of embodiments 1 through 26.

28. The curable composition of embodiment 27 wherein the photoinitiator is a free-radical photoinitiator.

29. The curable composition of embodiment 28 wherein the free-radical photoinitiator is selected from benzophenone, 4-methylbenzophenone, benzoyl benzoate, phenylacetophenones, 2,2-dimethoxy-2-phenylacetophenone, alpha,alpha-diethoxyacetophenone, hydroxycyclohexylphenylketone, 2-hydroxy-2-methyl-1-phenylpropan-1-one, bis-(2,6-dimethoxybenzoyl)-2,4,4-trimethylpentyl phosphine oxide, 2-hydroxy-2-methyl-1-phenylpropan-1-one, 2-hydroxy-2-methyl-1-phenylpropan-1-one, 2,4,6-trimethylbenzoyl-diphenylphosphine oxide, and combinations thereof.

30. The curable composition of any one of embodiments 27 through 29 further comprising nanoparticles.

31. The curable composition of embodiment 30 wherein the nanoparticles comprise silica nanoparticles.

32. The curable composition of any one of embodiments 27 through 31 further comprising an organic solvent.

33. The curable composition of embodiment 32 wherein the organic solvent is a polar solvent.

34. The curable composition of embodiment 33 wherein the polar organic solvent comprises isopropanol, methyl ethyl ketone, methyl isobutyl alcohol, ethanol, tetrahydrofuran, dimethylformamide, or combinations thereof.

35. An article comprising a substrate and the curable composition of any one of embodiments 27 through 34 in a layer disposed on at least a portion of at least one surface of the substrate.

36. The article of embodiment 35 wherein the layer is patterned.

37. An article comprising a substrate and a cured coating layer prepared by UV curing the composition of any one of embodiments 27 through 34 disposed on at least a portion of at least one surface of the substrate.

38. The article of embodiment 37 wherein the layer is patterned.

39. A method of making a cured coating on a substrate surface, the method comprising:
coating a curable composition of any one of embodiments 27 through 34 on at least a portion of at least one substrate surface;

optionally exposing the coated curable composition to conditions that allow an organic solvent, if present, to evaporate from the curable composition; and UV curing the curable composition.

40. The method of embodiment 39 wherein the curable silsesquioxane polymer is prepared by a method comprising subjecting a compound of the formula Z—Y—Si(R$^1$)$_3$ to a condensation reaction; wherein:

Y is a bond, an alkylene group, an arylene group, or a combination thereof;

Z is an ethylenically unsaturated group selected from a vinyl group, a vinylether group, a (meth)acryloyloxy group, and a (meth)acryloylamino group (including embodiments wherein the nitrogen is optionally substituted with methyl or ethyl); and each R$^1$ group is independently a hydrolyzable group; wherein the polymer includes —OH groups in an amount of at least 15 wt-% of the polymer.

41. The method of embodiment 39 wherein the curable silsesquioxane polymer is prepared by a method comprising subjecting a compound of the formula Z—Y—Si(R$^1$)$_3$ and a compound having the formula X—Y—Si(R$^1$)$_3$ to a condensation reaction; wherein:

Y is a bond, an alkylene group, an arylene group, or a combination thereof;

Z is an ethylenically unsaturated group selected from a vinyl group, a vinylether group, a (meth)acryloyloxy group, and a (meth)acryloylamino group (including embodiments wherein the nitrogen is optionally substituted with methyl or ethyl);

X is alkyl, fluoroalkyl, aryl, alkaryl, or a reactive group that is not an ethylenically unsaturated group, or a combination thereof; and each R$^1$ group is independently a hydrolysable group; wherein the polymer includes —OH groups in an amount of at least 15 wt-% of the polymer.

42. A method of preparing a curable silsesquioxane polymer comprising subjecting a compound of the formula Z—Y—Si(R$^1$)$_3$ optionally in combination with a compound of the formula X—Y—Si(R$^1$)$_3$ to a condensation reaction; wherein:

Y is a bond, an alkylene group, an arylene group, or a combination thereof;

Z is an ethylenically unsaturated group selected from a vinyl group, a vinylether group, a (meth)acryloyloxy group, and a (meth)acryloylamino group (including embodiments wherein the nitrogen is optionally substituted with methyl or ethyl);

X is alkyl, fluoroalkyl, aryl, alkaryl, or a reactive group that is not an ethylenically unsaturated group, or a combination thereof; and each R$^1$ group is independently a hydrolyzable group; wherein the condensation reaction is terminated such that the polymer includes —OH groups in an amount of at least 15 wt-% to 60 wt-% of the polymer.

43. A curable silsesquioxane polymer comprising a three-dimensional branched network having the formula:

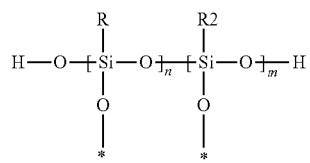

wherein:

the oxygen atom at the * is bonded to another Si atom within the three-dimensional branched network;

R is an organic group comprising an ethylenically unsaturated group;

R2 is an organic group that is not an ethylenically unsaturated group;

wherein n and m are selected such the copolymer comprises 30 to 80 mol % of repeat units comprising R.

44. A curable silsesquioxane polymer of claim 43 wherein the —OH groups are present in an amount of at least 15 wt-% of the polymer.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

Unless otherwise noted, all parts, percentages, ratios, etc., in the examples and in the remainder of the specification are by weight. Unless otherwise noted, all chemicals were obtained or are available from, chemical suppliers such as Aldrich Chemical Company, Milwaukee, Wis.

| Designation | Description | Supplier |
| --- | --- | --- |
| MONOMER-1 | Vinyltriethoxysilane | Gelest, |
| MONOMER-2 | Allyltriethoxysilane | Inc., |
| MONOMER-3 | Allylphenylpropyltriethoxysilane | Morrisville, |
| MONOMER-4 | 3-Butenyltriethoxysilane | PA |
| MONOMER-5 | Docosenyltriethoxysilane | |
| MONOMER-6 | Hexenyltriethoxysilane | |
| MONOMER 7 | Phenyltrimethoxysilane | |
| MONOMER 8 | Methyltriethoxysilane | |
| MONOMER 9 | Nonafluorohexyltriethoxysilane | |
| MONOMER 10 | Glycidoxypropyltriethoxysilane | |
| MONOMER 11 | 3-Methacryloxypropyltrimethoxysilane | |
| "IRGACURE 184" | 1-Hydroxy-cyclohexyl-phenyl-ketone | BASF Corporation, |
| "DAROCURE 1173" | 2-Hydroxy-2-methyl-1-phenylpropan-1-one | Florham Park, NJ |
| "DAROCURE 4265" | 50:50 by wt. mixture of 2,4,6-Trimethylbenzoyl-diphenylphosphine oxide and 2-hydroxy-2-methyl-1-phenylpropan-1-one | |
| "IPA-ST-ZL" | Colloidal silica sol, 70-100 nm particle size, 30 wt-% in IPA commercially available under trade designation "ORGANOSILICASOL IPA-ST-ZL" | Nissan Chemical Industries, Ltd., Chiyoda-Ku Tokyo, Japan |
| "IPA-ST-L" | Colloidal silica sol, 40-50 nm particle size, 30 wt-% in IPA commercially available under trade designation "ORGANOSILICASOL IPA-ST-L" | |
| "IPA-ST" | Colloidal silica sol, 10-15 nm particle size, 30 wt-% in IPA commercially available under trade designation "ORGANOSILICASOL IPA-ST" | |
| MEK | Methyl ethyl ketone | Sigma-Aldrich Chemical Company, St. Louis, MO |
| IPA | Isopropanol | |
| Oxalic Acid | Oxalic Acid | |
| Tartaric Acid | Tartaric Acid | |

| Designation | Description | Supplier |
| --- | --- | --- |
| 3SAB PET | 2-mil (0.058 millimeter (mm)) thick polyester terephthalate (PET) film, which has one side chemically treated or primed to improve the adhesion of silicone coatings, commercially available under the trade designation "HOSTAPHAN 3SAB" | Mitsubishi Polyester Film, Greer, SC |

Test Methods
Method for Peel Adhesion Measurement

Poly(vinylsilsesquioxane) (50 wt-% solution in methyl ethyl ketone) samples prepared according to EX1 and CE1, described below, were coated on 3SAB PET films using a knife coater to provide a dry coating having a thickness of 2-3 mil (0.058-0.076 mm). The coated PET films were placed in a forced air drying oven maintained at 70° C. (for 2 minutes) to evaporate the solvent. After drying, the coated PET films were cut into samples for measuring peel adhesion according to the method described below.

Peel adhesion of EX1 and CE1 samples was then measured with an IMASS SP-2000 peel tester (obtained from IMASS, Inc., Accord, Mass.) using 0.5 inch by 5 inch (about 1.25 cm by 12.7 cm) samples. The samples were applied to a clean glass panel using four total passes of a 2 kg-rubber roller. Prior to testing, the samples were allowed to dwell for 20 minutes at room temperature and 50 percent relative humidity. The panel was then mounted on the IMASS SP-2000 peel tester, and the samples were pulled off of the panel at a 90 degree angle at a speed of 30.48 cm/minute. Peel force was measured in units of ounces per inch (oz/inch) and was used to calculate the average peel force for a minimum of three samples and was then converted to Newtons per decimeter (N/dm).

Procedure for the Calculation of (%) OH Groups by FTIR

The amount of —OH groups present in the samples prepared according to the EX1 and CE1, described below, was determined as follows. About 0.1 g of poly(vinylsilsesquioxane) was applied as uniform thin layer directly on to a dried potassium bromide pellet and thereafter directly was analyzed by Fourier Transform Infrared Spectroscopy (FTIR), (Model Nicolet 6700 FTIR, from Thermo Fisher Scientific, Madison, Wis.). Using integration software ("OMNIC" software version 7.3, obtained from Thermo Fisher Scientific, Madison, Wis.), the total peak area from 500 $cm^{-1}$ to 4000 $cm^{-1}$ was calculated along with the area of the broad —OH absorbance peak from 3100 to 3600 $cm^{-1}$. The % OH was calculated by taking area of the —OH absorbance peak versus the total peak area.

Method for Pencil Hardness

ASTM D3363-05(2011)e2 "Standard Test Method for Film Hardness by Pencil Test" (available from ASTM International, West Conshohocken, Pa.) was used to ascertain the hardness of the cured films prepared according to the examples and comparative examples described below. Apparatus used in this study was ELCOMETER 3086 Scratch Boy (obtained from Elcometer Instruments Limited, Mich.). Pencil hardness was measured by moving a pencil of a designated hardness grade (i.e., 9B, 8B, 7B, 6B, 5B, 4B, 3B, 2B, B, HB, F, H, 2H, 3H, 4H, 5H, 6H, 7H, 8H, 9H, from the softest grade to hardest grade pencil), and thereafter looking at the surface under a microscope to find if the surface was scratched. The sample was designated a hardness value corresponding to the hardest pencil that did not microscopically scratch the surface of the sample.

Method for Thermogravimetric Analysis (TGA)

TGA analysis of the polymers was conducted on TGA 2950 Thermogravimetric Analyzer from TA Instruments, New Castle, Del. by ramping (rate of ramp-10° C./minute) the temperature of the pan with about 8-10 mg of polymer to 600° C. The weight loss of the polymer was recorded with respect to temperature ramp.

Examples 1-8 (EX1-EX8) and Comparative Example 1 (CE1)

For CE1, MONOMER 1 (100 g), DI water (50 g), and oxalic acid (0.5 g) were mixed together at room temperature in a 500 mL round bottom flask equipped with a condenser. The mixture was stirred at 70° C. for 24 hours followed by the partial evaporation of the solvents (water/ethanol mixture). The resulting solid was washed three-times with DI water (100 mL). After washing, the MEK was evaporated under reduced pressure to yield highly cross-linked polyvinylsilsesquioxane.

For EX1, MONOMER 1 (100 g), distilled (DI) water (50 g), and oxalic acid (0.5 g) were mixed together at room temperature in a 500 mL round bottom flask equipped with a condenser. The mixture was stirred at room temperature for 6-8 hours followed by the evaporation of the solvents (water/ethanol mixture). The resulting liquid was dissolved in MEK (100 mL) and washed three-times with DI water (100 mL). After washing, the MEK was evaporated under reduced pressure to yield polymer product polyvinylsilsesquioxane as a viscous liquid.

EX2-EX7 polymers were prepared in the same manner as EX1, using their respective monomers listed in Table 1, below.

EX8 polymer was prepared in the same manner as EX1; except the reaction mixture was stirred for only 3 hrs.

TABLE 1

| Example | Monomer | Polymer |
| --- | --- | --- |
| EX2 | MONOMER-2 | Poly(allylsilsesquioxane) |
| EX3 | MONOMER-3 | Poly(allylphenylpropylsilsesquioxane) |
| EX4 | MONOMER-4 | Poly(3-butenylsilsesquioxane) |
| EX5 | MONOMER-5 | Poly(docosenylsilsesquioxane) |
| EX6 | MONOMER-6 | Hexenylsilsesquioxane |
| EX7 | MONOMER-11 | Poly(3-methacryloxypropyl)silsesquioxane |
| EX8 | MONOMER 1 | Poly(vinylsilsesquioxane) |

EX1; EX8 and CE1 samples were tested to determine the % (—OH) groups present as well as the average peel adhesion using the methods described above. The data is presented in Table 2, below.

TABLE 2

| Example | Average Peel Adhesion (N/dm) | % (—OH) |
| --- | --- | --- |
| EX1 | 4.36 | 25.6 |
| EX8 | 1.7 | 56 |
| CE1 | 0.10 | 11.7 |

Example 9 (EX9)

Poly(vinylsilsesquioxane) (30 g), prepared above in EX1, was dissolved in 100 g of IPA:MEK (70:30 by wt.) mixture followed by the addition of IRGACURE 184 (0.3 g). Using

8 Mayer Rod, the mixture was then coated on a 3SAB PET film. The coated film was passed through a "LIGHT HAMMER 6" UV-chamber (obtained from Fusion UV Systems, Inc. Gaithersburg, Md., under trade designation "LIGHT HAMMER 6") equipped with an H-bulb located at 5.3 cm above sample at 12 meters/minute to cure the coating. The coating was cured to touch and adhered well to PET film. The pencil hardness of the cured EX9 sample determined using the method described above was 3H.

Examples 10-13 (EX10-EX13)

EX10-EX13 were prepared in the same manner as EX9, except that the polysilsesquioxane and the photoinitiator were varied as summarized in Table 3, below. The EX10-EX13 samples were cured to touch and adhered well to PET film.

TABLE 3

| Example | Polysilsesquioxane | Photoinitiator | Pencil Hardness |
|---|---|---|---|
| EX10 | EX2 | IRGACURE 184 | 3H |
| EX11 | EX3 | IRGACURE 184 | 3H |
| EX12 | EX1 | DAROCURE 1173 | 3H |
| EX13 | EX1 | DAROCURE 4265 | 3H |

Examples 14-16 (EX14-EX16)

EX14-EX16 were prepared in the same manner as EX9, except that the corresponding coating mixtures further contained 40 g of IPA-ST-L, 60 g of IPA-ST, and 10 g of IPA-ST-ZL silica sol, respectively. The EX14-EX16 samples were cured to touch and adhered well to PET film.

Example 17 (EX17)

For EX17, Monomer 1 (100 g; 0.52 moles), Monomer 7 (104 g; 0.51 moles), distilled water (100 g), and tartaric acid (1.0 g) were mixed together at room temperature in a 500 mL round bottom flask equipped with a condenser. The mixture was stirred at room temperature for 6-8 hours followed by the evaporation of solvents (water/ethanol mixture). The resulting viscous liquid was dissolved in a mixture of IPA:MEK (70:30 weight ratio, 100 mL) and washed three-times with deionized water (100 mL). After washing, the MEK was evaporated under reduced pressure to yield polyvinyl-co-phenyl silsesquioxane as tacky viscous liquid.

EX18-EX25 copolymers were prepared in the same manner as EX17, except using their respective monomers listed in Table 4, below.

TABLE 4

| Example | Monomers and amounts | Co-polymer | Physical state |
|---|---|---|---|
| EX18 | Monomer 1 (100 g; 0.52 moles) Monomer 7 (104 g; 0.51 moles) | Vinyl-co-phenyl silsesquioxane | Tacky liquid |
| EX19 | Monomer 1 (50 g; 0.26 moles) Monomer 7 (104 g; 0.51 moles) | Vinyl-co-phenyl silsesquioxane | Tacky liquid |
| EX20 | Monomer 1 (100 g; 0.52 moles) Monomer 8 (100 g; 0.56 moles) | Vinyl-co-methyl silsesquioxane | Tacky liquid |
| EX21 | Monomer 1 (50 g; 0.26 moles) Monomer 8 (100 g; 0.56 moles) | Vinyl-co-methyl silsesquioxane | Tacky liquid |
| EX22 | Monomer 1 (100 g; 0.52 moles) Monomer 9 (10 g; 0.048 moles) | Vinyl-co-nonafluorohexyl silsesquioxane | Tacky liquid |
| EX23 | Monomer 1 (50 g; 0.26 moles) Monomer 9 (10 g; 0.048 moles) | Vinyl-co-nonafluorohexyl silsesquioxane | Tacky liquid |
| EX24 | Monomer 1 (100 g; 0.52 moles) Monomer 10 (50 g; 0.18 moles) | Vinyl-co-glycidoxypropyl silsesquioxane | Tacky liquid |
| EX25 | Monomer 1 (50 g; 0.26 moles) Monomer 10 (50 g; 0.18 moles) | Vinyl-co-glycidoxypropyl silsesquioxane | Tacky liquid |

Thermogravimetric Analysis (TGA)

Examples 1 and 18 were subject to thermogravimetric analysis. The results are as follows:

Total percentage weight loss for EX1 polymer was 27%;
Total percentage weight loss for EX18 copolymer was 17%

Comparative Examples 2-3 (CE2-CE3)

For CE1, Monomer 1 (10 g; 0.052 moles), Monomer 8 (104 g; 0.56 moles), distilled water (100 g) and tartaric acid (1.0 g) were mixed together at room temperature in a 500 mL round bottom flask equipped with a condenser. The mixture was stirred at room temperature for 6-8 hrs followed by the evaporation of solvents (water/ethanol mixture) that resulted in vinyl-co-methyl silsesquioxane as hard solid foam.

CE2-CE3 copolymers were prepared in the same manner as CE1, using their respective monomers listed in Table 5, below

TABLE 5

| Example | Monomers and amounts | Co-polymer | Physical State |
|---|---|---|---|
| CE2 | Monomer 1 (15 g; 0.077 moles) Monomer 3 (100 g; 0.56 moles) | Vinyl-co-methyl silsesquioxane | Non-tacky Solid |
| CE3 | Monomer 1 (10 g; 0.052 moles) Monomer 2 (104 g; 0.51 moles) | Vinyl-co-phenyl silsesquioxane | Non-tacky Solid |

Examples 26-32 (EX26-EX32)

For EX26 vinyl-co-phenyl silsesquioxane (30 g), prepared above in EX17, was dissolved in a mixture of IPA:MEK (70:30 weight ratio, 100 g) mixture followed by the addition of IRGACURE 184 (0.3 g). Using #8 Mayer Rod, the mixture was then coated on a 3SAB PET film. The coated film was passed through a "LIGHT HAMMER 6" UV-chamber (obtained from Fusion UV Systems, Inc., Gaithersburg, Md., under trade designation "LIGHT HAMMER 6") equipped with an H-bulb 15 located at 5.3 cm above sample at 12 meters/minute to cure the coating. The coating was cured to touch and adhered well to PET film.

EX27-EX29 were prepared in the same manner as EX26, except that the corresponding coating mixtures further contained 40 g of IPA-ST-L, 60 g of IPA-ST, and 10 g of IPA-ST-ZL, respectively. The EX27-EX29 samples were cured to touch and adhered well to PET film.

EX30-EX32 were prepared in the same manner as EX26, except that the copolymers used were varied as summarized in Table 6, below.

TABLE 6

| Example | Copolymer |
|---------|-----------|
| EX30 | Vinyl-co-methyl silsesquioxane |
| EX31 | Vinyl-co-nonafluorohexyl silsesquioxane |
| EX32 | Vinyl-co-glycidoxypropyl silsesquioxane |

What is claimed is:

1. A curable silsesquioxane polymer comprising a three-dimensional branched network which is a condensation reaction product of a compound having the formula Z—Y—Si(R$^1$)$_3$ and a compound having the formula X-Y-Si(R$^1$)$_3$ wherein:
   Y is a bond, an alkylene group, an arylene group, or a combination thereof;
   Z is an ethylenically unsaturated group selected from a vinyl group, a vinylether group, a (meth)acryloyloxy group, and a (meth)acryloylamino group, wherein the nitrogen is optionally substituted with methyl or ethyl;
   X is hydrogen, alkyl that optionally comprises halogen substituents, aryl, alkaryl, arylalkyl, or a reactive group that is not an ethylenically unsaturated group; and
   each R$^1$ group is independently a hydrolysable group;
   wherein the curable silsesquioxane polymer includes —OH groups in an amount of at least 15 wt-% of the curable silsesquioxane polymer.

2. The curable silsesquioxane polymer of claim 1 wherein Y is a bond, a (C1-C20)alkylene group, a (C6-C12)arylene group, a (C6-C12)alk(C1-C20)arylene group, a (C6-C12)ar(C1-C20)alkylene group, or a combination thereof.

3. A curable composition comprising a photoinitiator and the curable silsesquioxane polymer of claim 1.

4. The curable composition of claim 3 further comprising nanoparticles, organic solvent, or a mixture thereof.

5. An article comprising a substrate and the curable composition of claim 3 in a layer disposed on at least a portion of at least one surface of the substrate.

6. The article of claim 5 wherein the curable composition has a 90 degree peel force from glass of at least 1 N/dm at 30.48 cm/minute.

7. An article comprising a substrate and a cured coating layer prepared by UV curing the composition of claim 3 disposed on at least a portion of at least one surface of the substrate.

8. A method of making a cured coating on a substrate surface, the method comprising:
   coating a curable composition of claim 3 on at least a portion of at least one substrate surface;
   optionally exposing the coated curable composition to conditions that allow an organic solvent, if present, to evaporate from the curable composition; and
   UV curing the curable composition.

9. A method of preparing a curable silsesquioxane polymer comprising subjecting a compound of the formula Z—Y—Si(R$^1$)$_3$ in combination with a compound of the formula X-Y-Si(R$^1$)$_3$ to a condensation reaction;
   wherein:
   Y is a bond, an alkylene group, an arylene group, or a combination thereof;
   Z is an ethylenically unsaturated group selected from a vinyl group, a vinylether group, a (meth)acryloyloxy group, and a (meth)acryloylamino group, wherein the nitrogen is optionally substituted with methyl or ethyl;
   X is hydrogen, alkyl, optionally comprises halogen substituents, aryl, alkaryl, arylalkyl or a reactive group that is not an ethylenically unsaturated group; and
   each R$^1$ group is independently a hydrolyzable group;
   wherein the condensation reaction is terminated such that the curable silsesquioxane polymer includes —OH groups in an amount of at least 15 wt-% to 60 wt-% of the curable silsesquioxane polymer.

10. The curable silsesquioxane polymer of claim 1 wherein the —OH groups are present in an amount of no greater than 60 wt-% of the curable silsesquioxane polymer.

11. The curable silsesquioxane polymer of claim 1 wherein the —OH groups are present in an amount of no greater than 30 wt-% of the curable silsesquioxane polymer.

12. The method of preparing a curable silsesquioxane polymer of claim 9 wherein the —OH groups are present in an amount of no greater than 30 wt-% of the curable silsesquioxane polymer.

* * * * *

UNITED STATES PATENT AND TRADEMARK OFFICE
CERTIFICATE OF CORRECTION

PATENT NO. : 9,453,109 B2  
APPLICATION NO. : 14/441522  
DATED : September 27, 2016  
INVENTOR(S) : Jitendra Rathore Page 1 of 1

It is certified that error appears in the above-identified patent and that said Letters Patent is hereby corrected as shown below:

On the Title Page

Column 2 (Other Publications)
Line 4, Delete "Siliones:" and insert -- Silicones: --, therefor.

Page 2 Column 2 (Other Publications)
Line 4, Delete "Silesquioxanes"," and insert -- Silsesquioxanes", --, therefor.

In the Specification

Column 2
Line 11, Delete "(R')3" and insert -- (R1)3 --, therefor.
Line 13, Delete "alkyaryl," and insert -- alkylaryl, --, therefor.

Column 9
Line 39 (Approx.), Delete "allytriethoxysilane" and insert -- allyltriethoxysilane --, therefor.

Column 10
Line 43 (Approx.), Delete "silsequioxane," and insert -- silsesquioxane, --, therefor.
Line 45 (Approx.), Delete "silsequioxane)." and insert -- silsesquioxane). --, therefor.

Column 11
Line 48 (Approx.), Delete "silsequioxane" and insert -- silsesquioxane --, therefor.

Column 17
Line 10, Delete "substitutents," and insert -- substituents, --, therefor.

Column 20
Line 39 (Approx.), Delete "Phenytrimethoxysilane" and insert -- Phenyltrimethoxysilane --, therefor.

Signed and Sealed this  
Ninth Day of May, 2017

Michelle K. Lee  
*Director of the United States Patent and Trademark Office*